United States Patent
Klubertanz (10) Patent No.: US 7,827,238 B2
(45) Date of Patent: Nov. 2, 2010

(54) EXCHANGING DATA USING PROGRAMMATIC CONVERSION TO EMULATED HTML FORM DATA

(75) Inventor: Timothy John Klubertanz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 12/357,923

(22) Filed: Jan. 22, 2009

(65) Prior Publication Data

US 2009/0193076 A1    Jul. 30, 2009

Related U.S. Application Data

(63) Continuation of application No. 10/331,410, filed on Dec. 30, 2002, now Pat. No. 7,552,168.

(51) Int. Cl.
*G06F 15/16* (2006.01)
(52) U.S. Cl. ................. 709/203; 709/201; 709/202
(58) Field of Classification Search .......... 709/201–203
See application file for complete search history.

(56) References Cited

U.S. PATENT DOCUMENTS

| | | | | |
|---|---|---|---|---|
| 6,078,921 | A * | 6/2000 | Kelley | 1/1 |
| 6,092,114 | A * | 7/2000 | Shaffer et al. | 709/232 |
| 6,199,079 | B1 * | 3/2001 | Gupta et al. | 715/207 |
| 6,209,124 | B1 | 3/2001 | Vermeire et al. | |
| 6,421,693 | B1 * | 7/2002 | Nishiyama et al. | 715/226 |
| 6,615,212 | B1 * | 9/2003 | Dutta et al. | 1/1 |
| 6,636,929 | B1 * | 10/2003 | Frantz et al. | 710/313 |
| 6,651,217 | B1 * | 11/2003 | Kennedy et al. | 715/224 |
| 6,654,784 | B1 * | 11/2003 | Wei | 709/203 |
| 6,810,429 | B1 * | 10/2004 | Walsh et al. | 709/246 |
| 6,983,328 | B2 * | 1/2006 | Beged-Dov et al. | 709/230 |
| 6,993,585 | B1 * | 1/2006 | Starkovich et al. | 709/228 |
| 7,330,876 | B1 * | 2/2008 | Rawat et al. | 709/205 |
| 2001/0047386 | A1 * | 11/2001 | Domenikos et al. | 709/203 |
| 2002/0078143 | A1 * | 6/2002 | De Boor et al. | 709/203 |
| 2002/0107755 | A1 * | 8/2002 | Steed et al. | 705/26 |
| 2002/0156846 | A1 * | 10/2002 | Rawat et al. | 709/203 |
| 2003/0028792 | A1 * | 2/2003 | Plow et al. | 713/193 |
| 2004/0243609 | A1 * | 12/2004 | Singh | 707/100 |
| 2006/0168158 | A1 * | 7/2006 | Das | 709/220 |

* cited by examiner

*Primary Examiner*—Nathan Flynn
*Assistant Examiner*—Mohamed Wasel
(74) *Attorney, Agent, or Firm*—Roy W. Truelson (57) ABSTRACT

Programming code embedded in an application automatically converts local client data to emulated HTML multi-part form data, without downloading a corresponding form from a web server. The selection of data for conversion is performed programmatically, without the need for interactive user specification of each data item. The emulated HTML multi-part form data is transmitted to a web server as a service request. Preferably, the client application is a configuration utility which generates a record of a computer system configuration, and the server performs the function of configuration verification on configuration data formatted as emulated HTML multi-part form data. The server concurrently maintains a web page which will, on request, download an HTML form corresponding to a system configuration to a web browser, from which a user may specify a system configuration to be verified.

6 Claims, 6 Drawing Sheets

EXCHANGING DATA USING PROGRAMMATIC CONVERSION TO EMULATED HTML FORM DATA

CROSS-REFERENCE TO RELATED APPLICATION

This is a continuation application of U.S. patent application Ser. No. 10/331,410, filed Dec. 30, 2002, entitled "Method and Apparatus for Exchanging Data Using Programmatic Conversion to Emulated HTML Form Data", which is herein incorporated by reference. This application claims priority under 35 U.S.C. §120 of U.S. patent application Ser. No. 10/331,410, filed Dec. 30, 2002.

FIELD OF THE INVENTION

The present invention relates to the use of the Internet, and in particular, to the use of HTML form data for communicating data to an Internet server.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users. At the same time, the cost of computing resources has consistently declined, so that information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The reduced cost of computing and the general availability of digital devices has brought an explosion in the volume of information stored in such devices. With so much information stored in digital form, it is naturally desirable to obtain wide access to the information from computer systems. The volume of information dwarfs the storage capability of any one device. To improve information access, various techniques for allowing computing devices to communicate and exchange information with one another have been developed. Perhaps the most outstanding example of this distributed computing is the World Wide Web (often known simply as the "web"), a collection of resources which are made available throughout the world using the Internet. People from schoolchildren to the elderly are learning to use the web, and finding an almost endless variety of information from the convenience of their homes or places of work. Businesses, government, organizations and even ordinary individuals are making information available on the web, to the degree that it is now the expectation that anything worth knowing about is available somewhere on the web.

The Internet, which provides the support for the web as well as for e-mail and other forms of communication and distributed processing among multiple digital systems, is a heterogeneous network of digital devices (nodes) connected by multiple links, so that between any two nodes of the network there are typically multiple paths, giving the Internet some degree of redundancy. Data is sent in packets, each packet being routed across multiple successive nodes until it reaches its destination.

At the basic level of routing packets, the Internet is capable of transferring any arbitrary data from one node to another, and may thus be viewed as a communications medium. However, the usefulness of the Internet depends on the applications which handle data exchanges at the source and destination nodes. The advent of web browsers and other web applications has thus greatly expanded the use of the Internet, by making the basic information transfer technology available for use on an individual, interactive basis to people without extensive computer programming skills.

It should therefore be recognized that enhancements to the usability of Internet technology have been critical to the Internet's widespread acceptance, and that we may expect this to be true of continued use and expansion of the Internet and related technologies for solving problems in the future.

The World Wide Web employs an interactive client-server paradigm. In response to user input, an interactive browser application executing on a client submits a request to a server using a pre-defined protocol. The server responds in real time, and the browser formats the response for display to the user. At the most basic level of interaction, the user simply requests a document (such as a web page) by sending a URL of the desired document, and the server responds by sending a copy of the requested document. In some cases, a more complex data interchange may be desired. For example, a user may provide search parameters to a search engine, order and billing information to an on-line shopping server, and so forth.

One mechanism for supporting more complex data interchange in a web transaction is the use of HTML forms. An HTML form specifies the type of input to be provided from a client to a web server application. Typically, the browser downloads an HTML form from the web server. User data is gathered by the browser and is formatted according to the HTML form. This data ("form data") is then sent to the server as part of an HTTP request. The server then processes the request including the form data, and responds to the client appropriately. The user data may be the result of user interactive input, but an HTML form can also be used to transmit data from a file selected by the user and arrange this data in the format specified by the HTML form. Although form data is often a simple string, it may comprise multiple parts ("multipart form data") and come from multiple sources such as combinations of files, interactive or other input. An HTML form thus enables a user to communicate complex data to a web server in a server-specified format.

As useful as this mechanism is, it has generally been limited by the environment for which it was created, i.e., the paradigm of an interactive browser. It is designed for use in isolated, real-time transactions, where the amount of user input required is fairly limited. Although not necessarily recognized, the underlying mechanisms might be extended for use in other contexts, specifically in contexts involving non-interactive, or programmatic exchange of data, in which the volume of data exchanged might be much greater, in which it is undesirable to burden the user with a lengthy interactive selection session and/or in which the data is not exchanged in real time. Current browser tools based on the interactive paradigm make use of HTML forms in such other contexts difficult, impossible or inconvenient.

SUMMARY OF THE INVENTION

In accordance with the present invention, programming code embedded in an application other than a web browser automatically converts local client data to emulated HTML multi-part form data, without downloading a corresponding form from a web server. The selection of data for conversion is performed programmatically, without the need for interactive user specification of each required data item. The emulated HTML multi-part form data is transferred to a server over the Internet, in much the same way that such data would be sent by a browser to a web server.

In the preferred embodiment, the client application is a configuration utility which generates an electronic record of a configuration for a computer system. Such a configuration utility may be used, e.g., for ordering system components, for pricing and performance comparisons, for generating manufacturing or installation instructions, for diagnosis, and the like. The server performs the function of configuration verification, i.e., it verifies that configurations submitted to it comply with all applicable characteristics and limitations of the devices employed. The client application generates multiple configurations, and automatically submits each configuration to the server by converting the configuration record to emulated HTML multi-part form data and transmitting the emulated form data to the server over the Internet. The server then verifies the configuration and returns a result in the form of a report, which is formatted as either HTML or XML data. This is re-converted to a suitable verification report form by the client application.

In the preferred embodiment, the server operates a web page which will, on request, download an HTML form corresponding to a system configuration to a web browser, from which a user may specify a system configuration to be verified. Thus the server actually supports verification requests from a conventional web browser as well as from a special application which generates the emulated HTML multi-part form data programmatically, as described herein. Therefore, users without the special application software are still supported.

The capability to generate complex and multi-part requests to the server independent of an interactive browser frees the application of the need for tedious user selection of data to be sent to the server. Furthermore, it permits the application to schedule the submission of multiple verification requests at a time when the client and/or server is unlikely to be busy. Finally, it enables complex data to be obtained from dynamic data structures in memory, without the need to create a file in the client system's file structure which is then selected by the user, and thus potentially improves performance for certain applications.

The details of the present invention, both as to its structure and operation, can best be understood by reference to the accompanying drawings, in which like reference numerals refer to like parts, and in which:

DETAILED DESCRIPTION OF THE PREFERRED EMBODIMENT OVERVIEW

Prior to discussing the operation of embodiments of the invention, a brief overview discussion of the Internet is provided herein.

The term "Internet" is a shortened version of "Internetwork", and refers commonly to a collection of computer networks that utilize the TCP/IP suite of protocols, well-known in the art of computer networking. TCP/IP is an acronym for "Transport Control Protocol/Internet Protocol", a software protocol that facilitates communications between computers.

Figure 1:
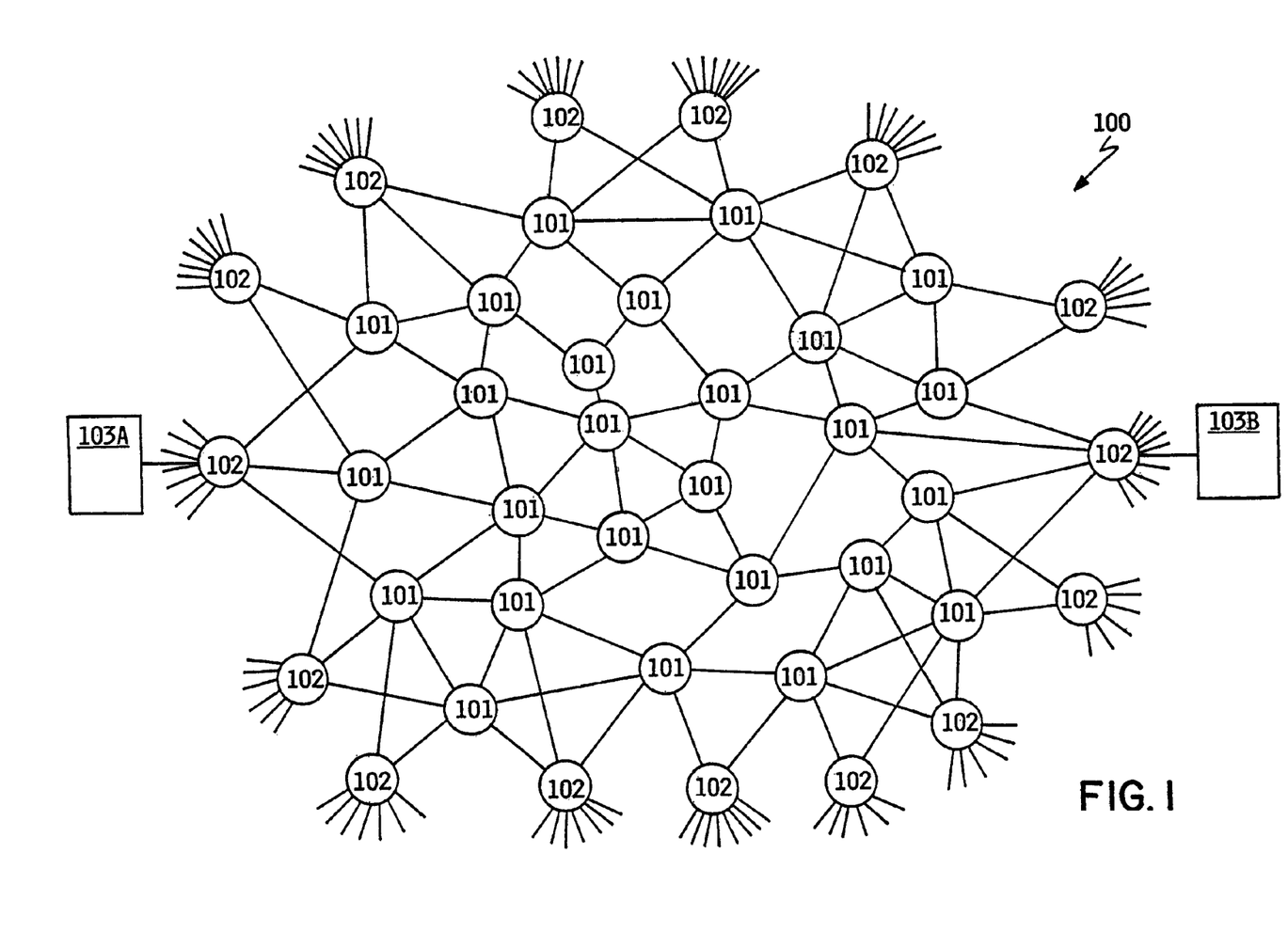
FIG. 1 is a high-level conceptual view of the Internet.

FIG. 1 is a high-level conceptual view of the Internet. The Internet has no pre-established topology, and is indefinitely extensible by adding new nodes and links. A node may have any number of links connecting it to other nodes, and these may use any of various communications technologies, having different data capacities and other characteristics. The topology of the Internet therefore becomes an extremely complex interconnected network, in which there are typically a large number of possible pathways between any two nodes.

The central part of the network, sometimes called the "backbone", contains multiple high-speed routers 101 which receive data packets and forward these on to other nodes in the network. Typically, each router has multiple connections to other routers, and these connections have a high data capacity. For example, fiber optic links are often used between high-speed routers 101. Connected to the high-speed routers are nodes which serve as access points to the Internet "backbone" of high-speed routers, illustrated in FIG. 1 as nodes 102. Access nodes 102 are also routers since they function to route data packets between the high-speed routers 101 and other network nodes, but they typically employ lower-speed connections. An access node may be, for example, a public Internet Service Provider which provides access to the Internet through telephone lines or other connections for a fee, or may be an access node of a large company for its internal systems. Usually, each access node 102 connects to multiple high-speed routers 101 to provide redundancy, although this is not a requirement. Each access node typically provides access to multiple host computer systems 103A, 103B (referred to generically as reference numeral 103), of which only two are illustrated in FIG. 1. Hosts 103 are the computer systems which connect to the Internet and which generate as the source or receive as the ultimate destination the data packets transmitted over the Internet. Hosts 103 may be any type of computer system, from large mainframe systems to PCs to handheld portable devices. Often, a host has only one access node 102 which it uses to access the Internet (in which case it is non-redundant), although it may have multiple such access nodes for redundancy. The connection between the host and the access node is often relatively low speed (such as a telephone line or radio frequency link), but could be a high-speed link. In the case of some computer systems, such as large Internet servers which function primarily to provide information over the Internet, the host may be connected directly to high-speed routers 101 and therefore serve as its own access node.

It will be understood that FIG. 1 is intended as a conceptual illustration of the Internet, and that in reality the number of nodes and connections on the Internet is vastly larger than illustrated in FIG. 1, and that the topology of the connections may vary. Furthermore, it will be understood that there may be further hierarchies of types of connections and forms of access, which are not shown in FIG. 1 for clarity of illustration. I.e., there may be multiple types or classes of access node 102 through which a host connects to reach the high-speed routers 101 of the backbone, and that different hosts may connect at different levels of access node. Strictly speaking, the Internet comprises all devices coupled to it, and when a small computer system such as a PC is logged on to the Internet, it is part of the Internet in the sense that it becomes an Internet node and has an address (although the address may be only temporary). Often, the routers and connections of the Internet backbone and access nodes are referred to as the Internet, i.e., the Internet is viewed as a communications medium as opposed to a distributed processing network of computer systems. Depending on the context, either usage may be employed.

Networked systems typically follow a client server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without needing to know any working details about the other program or the server itself. In networked systems, a client is usually a computer that accesses shared network resources provided by another computer (i.e., a server).

A server is typically a remote computer system accessible over a communications medium such as the Internet. The server scans and searches for information sources. Based upon such requests by the user, the server presents filtered, electronic information to the user as server response to the client process. The client process may be active in a first computer system, and the server process may be active in a second computer system; the processes communicate with one another over a communications medium that allows multiple clients to take advantage of the information gathering capabilities of the server. A server can thus be described as a network computer that runs administrative software that controls access to all or part of the network and its resources, such as data on a disk drive. A computer acting as a server makes resources available to computers acting as workstations on the network.

Client and server can communicate with one another utilizing the functionality provided by a hypertext transfer protocol (HTTP). The World Wide Web (WWW), or simply, the "web", includes all servers on the Internet adhering to this protocol, which are accessible to clients via a Universal Resource Locator (URL) address. Internet services can be accessed by specifying Universal Resource Locators that have two basic components: a protocol to be used and an object pathname. For example, the Universal Resource Locator address, "http://www.uspto.gov/web/menu/intro.html" is an address to an introduction about the U.S. Patent and Trademark Office. The URL specifies a hypertext transfer protocol ("http") and a name ("www.uspto.gov") of the server. The server name is associated with a unique, numeric value (i.e., a TCP/IP address). The URL also specifies the name of the file that contains the text ("intro.html") and the hierarchical directory ("web") and subdirectory ("menu") structure in which the file resides on the server.

Active within the client is a first process that establishes the connection with the server, sends HTTP requests to the server, receives HTTP responses from the server, and presents information to the user. Conventionally, this first process is an interactive browser application. The server itself executes corresponding server software that presents information to the client in the form of HTTP responses. The HTTP responses correspond to "web pages" constructed from a Hypertext Markup Language (HTML), or other server-generated data.

The browser retrieves a web page from the server and displays it to the user at the client. A "web page" (also referred to as a "page" or a "document") is typically a data file written in a hyper-text language, such as HTML, that may have text, graphic images, and even multimedia objects, such as sound recordings or moving video clips associated with that data file, although the web page could also be simply an image. A hyper-text page contains control tags and data. The control tags identify the structure: for example, the headings, sub-headings, paragraphs, lists, and embedding of images. The data consists of the contents, such as text or multimedia, that will be displayed or played to the user. A browser interprets the control tags and formats the data according to the structure specified by the control tags to create a viewable object that the browser displays, plays or otherwise performs to the user. A control tag may direct the browser to retrieve a page from another source and place it at the location specified by the control tag. In this way, the browser can build a viewable object that contains multiple components, such as spreadsheets, text, hotlinks, pictures, sound, chat-rooms, and video objects. A web page can be constructed by loading one or more separate files into an active directory or file structure that is then displayed as a viewable object within a graphical user interface.

In the simple case described above, information transfer is basically one-way, the client browser only requesting the information (as by identifying a desired document by its URL) and the server providing it. It is also possible for a client to provide information to a server according to a server designated format. A server may specify a format in which information from the client is to be sent by providing an HTML form on the web. The client browser accesses the server and retrieves the HTML form, just as it would any web page. The browser formats the HTML form for interactive display to the user. The form typically contains one or more interactive input fields, in which the user can specify input data. This input data might be text data which is directly entered by the user in an interactive input field (as, e.g., a credit card number), or it might be data obtained from a file on the client system, which is specified by the user in an interactive input field. The user data as specified is formatted according to the HTML form specification. This formatted user data (known as "form data", which may be multi-part) is then sent to the server in an HTTP request. The server then processes the request including the form data, and responds to the client appropriately.

DETAILED DESCRIPTION

Figure 2:
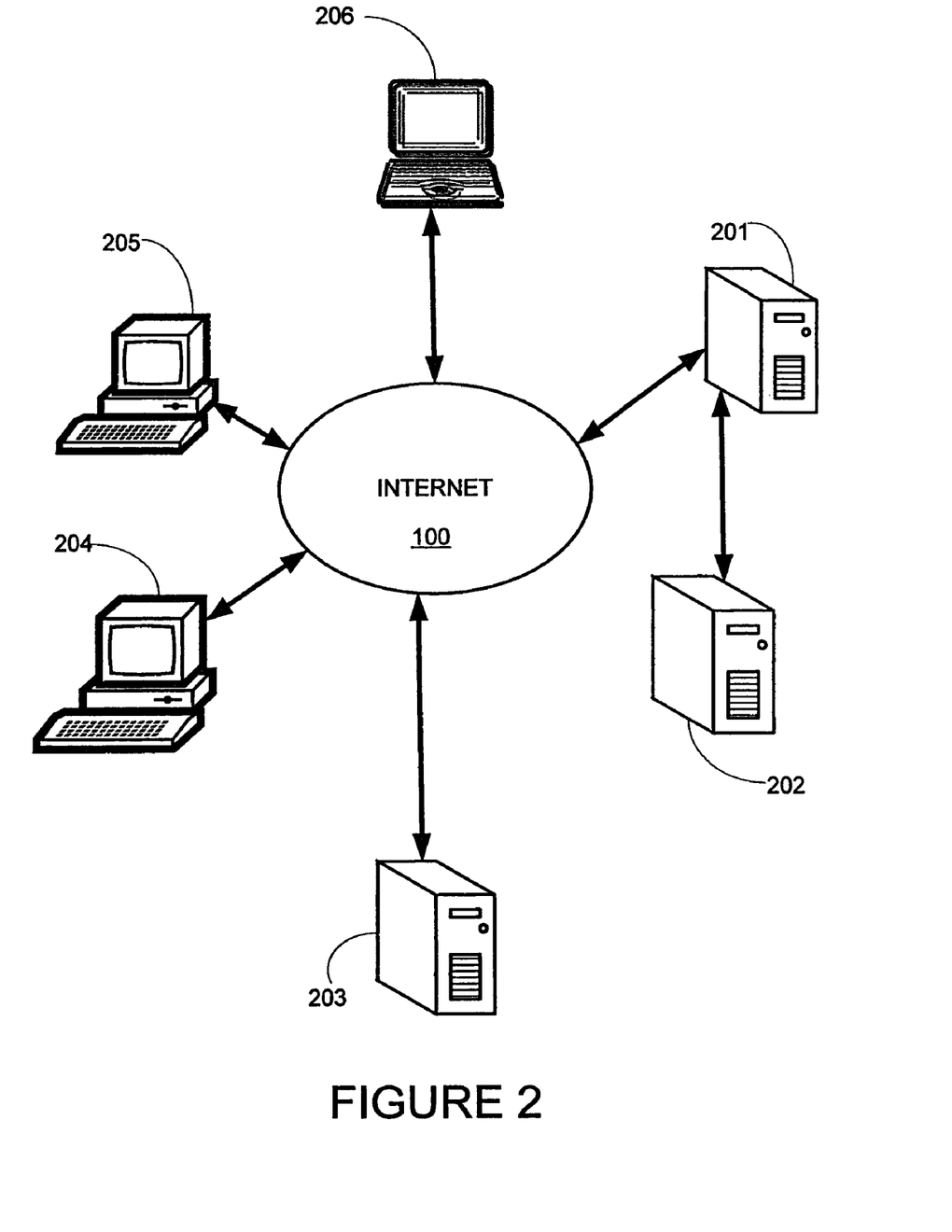
FIG. 2 is a high-level illustration of the major components of an Internet environment for operating a server servicing multiple clients which submit requests including multi-part form data, in accordance with the preferred embodiment.

Referring to the Drawing, wherein like numbers denote like parts throughout the several views, FIG. 2 is a high-level illustration of an Internet environment, showing some of the major components involved in a system in which one or more clients programmatically submits requests including multi-part form data to a server over the Internet, in accordance with the preferred embodiment of the present invention. As shown in FIG. 2, an Internet web server computer system 201 is coupled to the Internet 100 for receiving requests over the Internet. Web server 201 communicates with a separate application server computer system 202, which executes a program utilizing multi-part form data submitted by client as a request to web server 201, and returns results to the client via web server 201. In the exemplary embodiment, application server executes a system configuration verification program on system configuration data submitted to web server 201 as HTML multi-part form data in a client request, it being understood that the exemplary embodiment is just one application of many that might be performed by an application server. Thus, web server system 201 operates as a client interface, while application server 202 performs the actual manipulation of data to respond to the request. From the client's perspective, web server 201 and application server 202 are a single server system which responds to the client request, and in fact it would be possible to implement a server as a single, unitary system which combines web server 201 and application server 202, or to divide server functions in multiple systems, including more than two systems.

Multiple client systems 203-206 may submit requests over the Internet to web server 201 for verification of system configurations generated within the respective clients. Clients 203-206 may be of various types. FIG. 2 depicts a multi-user system 203, two single-user desktop systems 204, 205, and a laptop computer 206, it being understood that these are shown by way of example only, that other types of systems may serve as clients, and that the number and types of clients may vary. Some of clients 203-206 may execute interactive browser sessions, from which a user can request an HTML form allowing the user to submit a configuration verification request to web server 201, and which support interactive user input to provide the information for the HTML form and submission of the HTML form to server 201. In accordance with the preferred embodiment of the present invention, at least one client submits requests for verification of system configuration to server 201 programmatically and directly, in a format corresponding to the HTML form, but without requiring that the form be first downloaded and information provided interactively by the user, such submitted data being referred to herein as "emulated HTML multi-part form data". By convention, this client is designated herein client 203. It should be understood that any of clients 203-206 might provide this function, although in general it is anticipated that the programmatic submission of system configurations for verification is more likely to be performed by larger client systems, while the interactive, browser-based submission using conventional HTML forms is more likely to be performed by smaller, single-user client systems.

Figure 3:
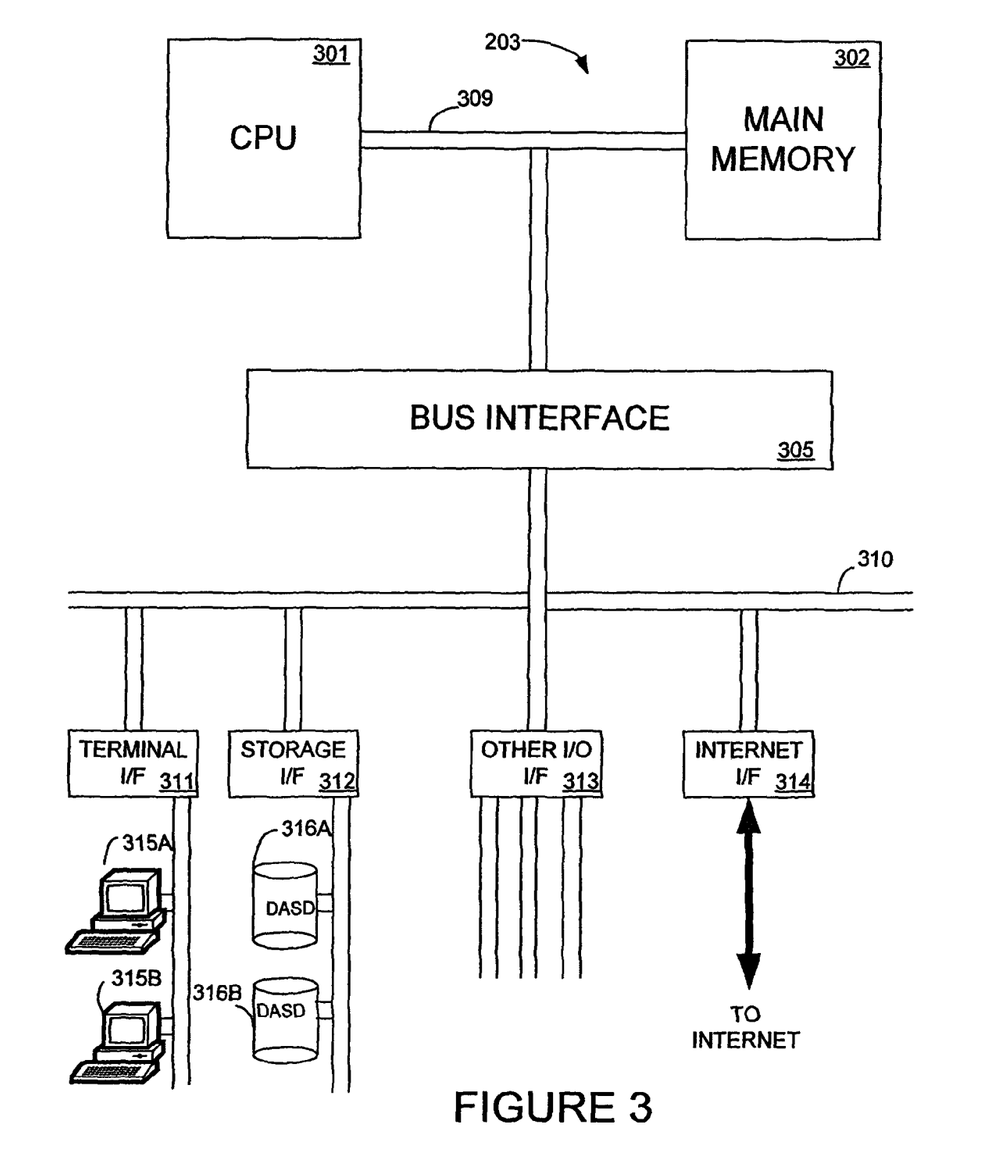
FIG. 3 is a high-level block diagram of the major components of a client computer system for submitting emulated multi-part form data to a server, according to the preferred embodiment.

FIG. 3 is a high-level block diagram of the major components of a client computer system 203 for submitting emulated HTML multi-part form data to server 201, according to the preferred embodiment. Client system 203 comprises central processing unit (CPU) 301, main memory 302, terminal interface 311, data storage interface 312, I/O interface 313, and Internet interface 314. The various devices communicate with each other via internal memory bus 309, I/O communications bus 310, and bus interface 305, as shown. CPU 301 is a general-purpose programmable processor, executing instructions stored in memory 302; while a single CPU is shown in FIG. 3, it should be understood that computer systems having multiple CPUs could be used. Memory 302 is a random-access semiconductor memory for storing data and programs; memory is shown conceptually as a single monolithic entity, it being understood that memory is often arranged in a hierarchy of caches and other memory devices. Memory bus 309 provides high speed data communication among CPU 301, main memory 302, and bus interface 305. Bus interface 305 provides an interface to one or more I/O buses 310 (of which one is shown), which communicate with various I/O interface units 311-314. Although a single memory bus 309, bus interface 305, and I/O bus 310 are shown in FIG. 3, it will be understood that the actual bus structure of a computer system may vary, that multiple buses or interface units of each type may be used, and that additional bus hierarchies and levels may exist for supporting communications among the various components of client system 203.

Terminal interface 311 provides a connection for the attachment of one or more user terminals 315A, 315B (referred to generally as 315), and may be implemented in a variety of ways. Many large server computer systems (mainframes) support the direct attachment of multiple terminals through terminal interface I/O processors, usually on one or more electronic circuit cards. Alternatively, interface 311 may provide a connection to a local area network to which terminals are attached. Various other alternatives are possible. Data storage interface 312 provides an interface to one or more data storage devices 316A, 316B (referred to generally as 316), which are preferably rotating magnetic hard disk drive units, although other types of data storage device could be used. Other I/O device interface 313 provides an interface to other types of I/O devices, such as printers, fax machines, etc. Internet interface 314 provides a physical connection for transmission of data to and from the Internet, and could use any of various available technologies. The client system shown in FIG. 3 is intended to be a simplified representation for illustrative purposes, it being understood that many variations in system configuration are possible in addition to those specifically mentioned here, and that the complexity of a typical system and number of attached devices is typically greater. While a multi-user system is illustrated in FIG. 3, client system 203 could conceivably be any of various types of digital system, including single-user systems such as so-called desktop personal computers or laptops.

Figure 4:
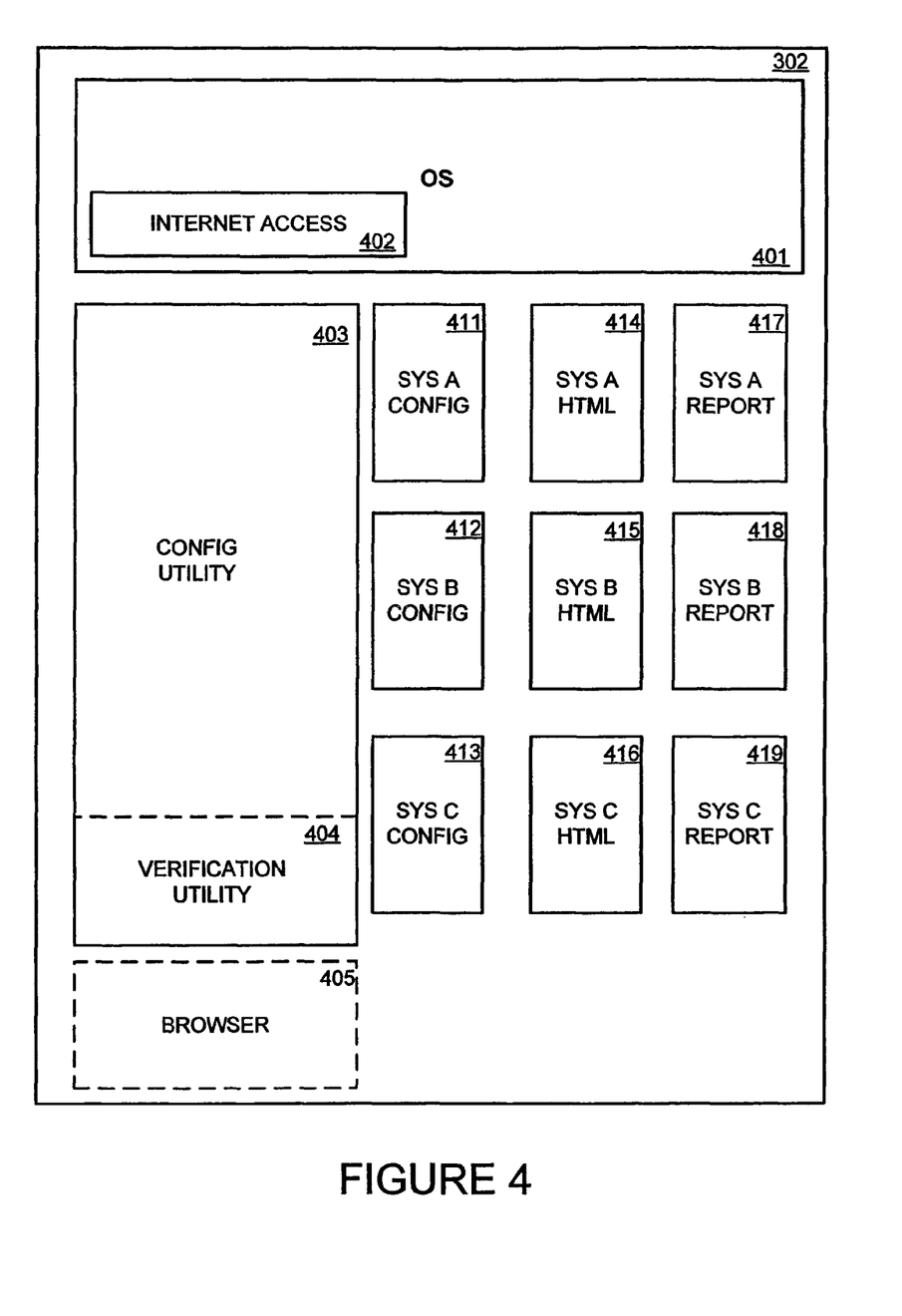
FIG. 4 is a conceptual illustration of the major software components of a client system, according to the preferred embodiment.

FIG. 4 is a conceptual illustration of the major software components of memory 302 in client system 203. Operating system 401 is executable code and state data providing various low-level software functions, such as device interfaces, management of memory pages, management of multiple tasks, etc. as is well-known in the art. In particular, operating system 401 includes Internet access function 402. Internet access function 402 is software which communicates through network interface 314 to the Internet, and is preferably integrated into a TCP/IP stack within operating system 401. Internet access function 402 generally handles Internet communications on behalf of applications executing in client system 203. Specifically, verification application 404 and browser application 405 invoke Internet access function 402 to handle communication of data over the Internet. Although Internet access function 402 is shown as part of operating system 401, it could alternatively be a separate software module.

Configuration utility 403 is an application program which is used to manage system configuration records 411-413 representing configurations of actual or hypothetical computer systems. Such configuration records may be used in a variety of contexts. As one typical example, configuration records are generated as part of a customer ordering process for new or updated computer systems. Such records could also be used for purposes of diagnosing existing computer systems, or for other purposes. Configuration utility 403 may contain any of various auxiliary functions (not shown), depending on its usage, such as an interactive editing interface, an automated configurator based on artificial intelligence programming techniques, graphical display functions, print formatter, order and pricing generator, and so forth. Configuration utility may contain any or all of the capabilities described above, or may contain other capabilities for managing configuration records.

Verification utility 404 is an application program which verifies a configuration record by converting certain configuration information in a configuration record 411-413 to a corresponding emulated HTML multi-part form data string 414-416 and transmitting it to server 201 over the Internet, as more fully described herein. Verification utility receives verification results from server 201 in HTML form, and converts this to a configuration verification report 417-419 in an appropriate form for use by configuration utility 403 or other software. Verification utility 404 may be embedded in configuration utility 403, or may be a separate program, as shown by the dashed line in FIG. 4.

Optional browser 405 is a conventional web browser application program, which is also capable of communicating over the web with server 201, requesting HTML forms, and submitting data formatted according to a received HTML form. Browser 405 is shown in FIG. 4 as an optional means for accessing the web server 201 and the verification software running in application server 202; however, browser 405 need not necessarily be present in computer system 203 according to the present invention.

Configuration records 411-413 contain information relating to a computer system configuration in a form which is useful to configuration utility 403 and/or useful to the user (customer, salesperson, etc.). Some of this information may be unnecessary for purposes of verifying a configuration, and in fact may be data which should not be passed to an Internet server for reasons of privacy, trade secret, or similar concerns. For example, a configuration is often prepared as a hypothetical system configuration for a potential customer. The configuration file may contain the name of the customer, customer requirements, price quoted to the customer, or any number of other sensitive data items, which are not necessary to verify a configuration. However, in addition to any such sensitive, or simply unnecessary information, a configuration record contains information needed to construct a computer system configuration for verification by servers 201 and 202. Emulated HTML multi-part form data strings 414-416 contain complete configuration information for corresponding computer systems in the form required by server 201, i.e., from the perspective of server 201, they are formatted as if the corresponding HTML form were downloaded from server 201 to browser 405, and the data was entered into the form from the browser. Verification reports 417-419 are in a form appropriate for the user (i.e., are typically not HTML), and may or may not contain data imported from configurations records 411-413 which was not provided to server 201.

FIG. 4 illustrates three configuration records 411-413, three corresponding emulated HTML multi-part form data strings 414-416, and three corresponding verification reports 417-419, it being understood that the actual number of such entities may vary, and that at any particular moment in time, it is possible that a configuration record will exist which has not yet been verified (no emulated HTML multi-part form data string has been generated, or no verification report has been generated, or both).

While the software components of FIG. 4 are shown conceptually as residing in memory, it will be understood that in general the memory of a computer system will be too small to hold all programs and data simultaneously, and that information is typically stored in data storage devices 316, and that the information is paged into memory by operating system 401 as required.

In accordance with the preferred embodiment of the present invention, verification utility 404 in client system 203 automatically converts a configuration to an emulated HTML multi-part form data string without actual downloading of use of the HTML form, and sends this to a server for verification. This process is illustrated in FIGS. 5 and 6

Figure 5:
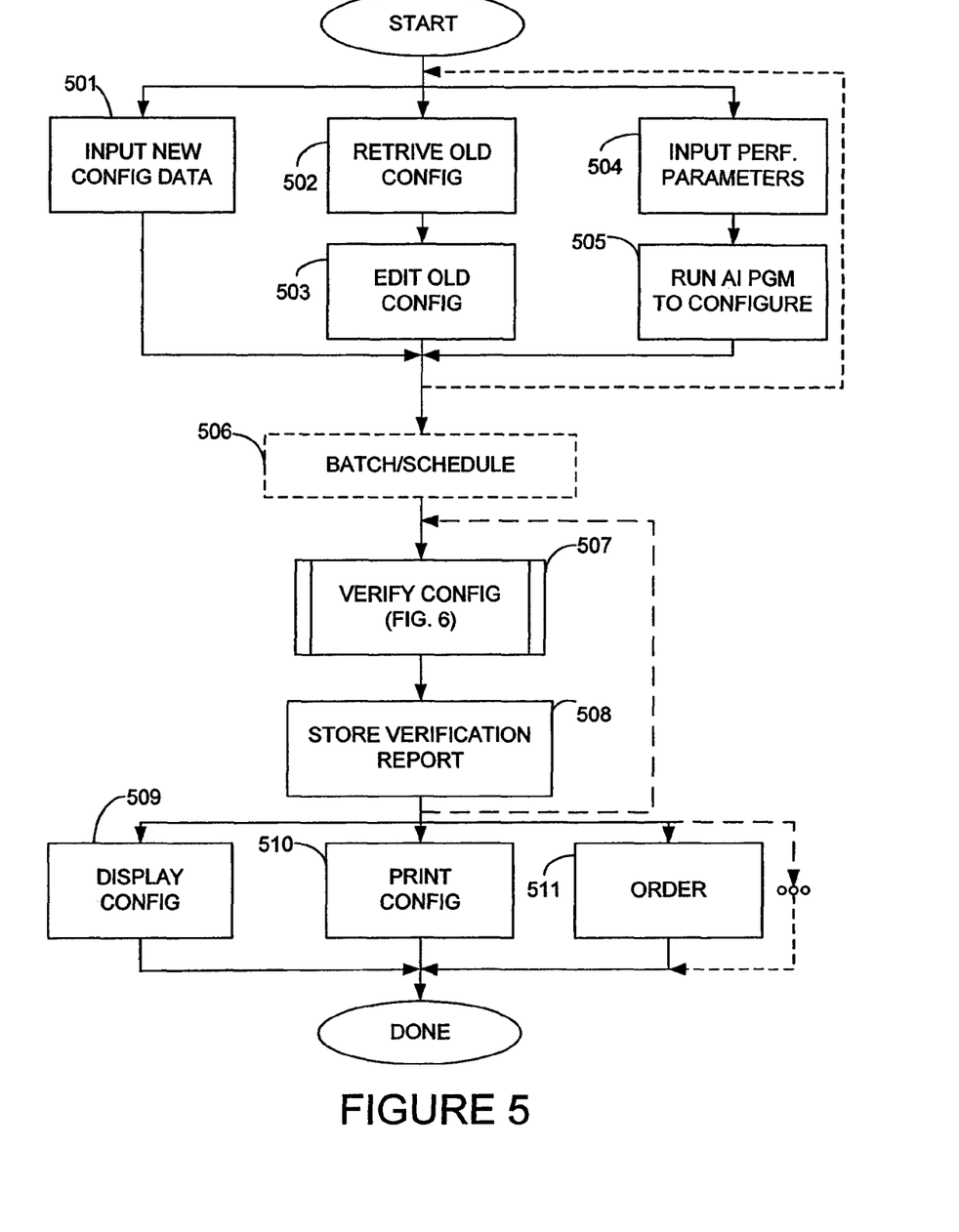
FIG. 5 is a high-level flow diagram of the process of managing computer system configuration records, according to the preferred embodiment.
Figure 6:
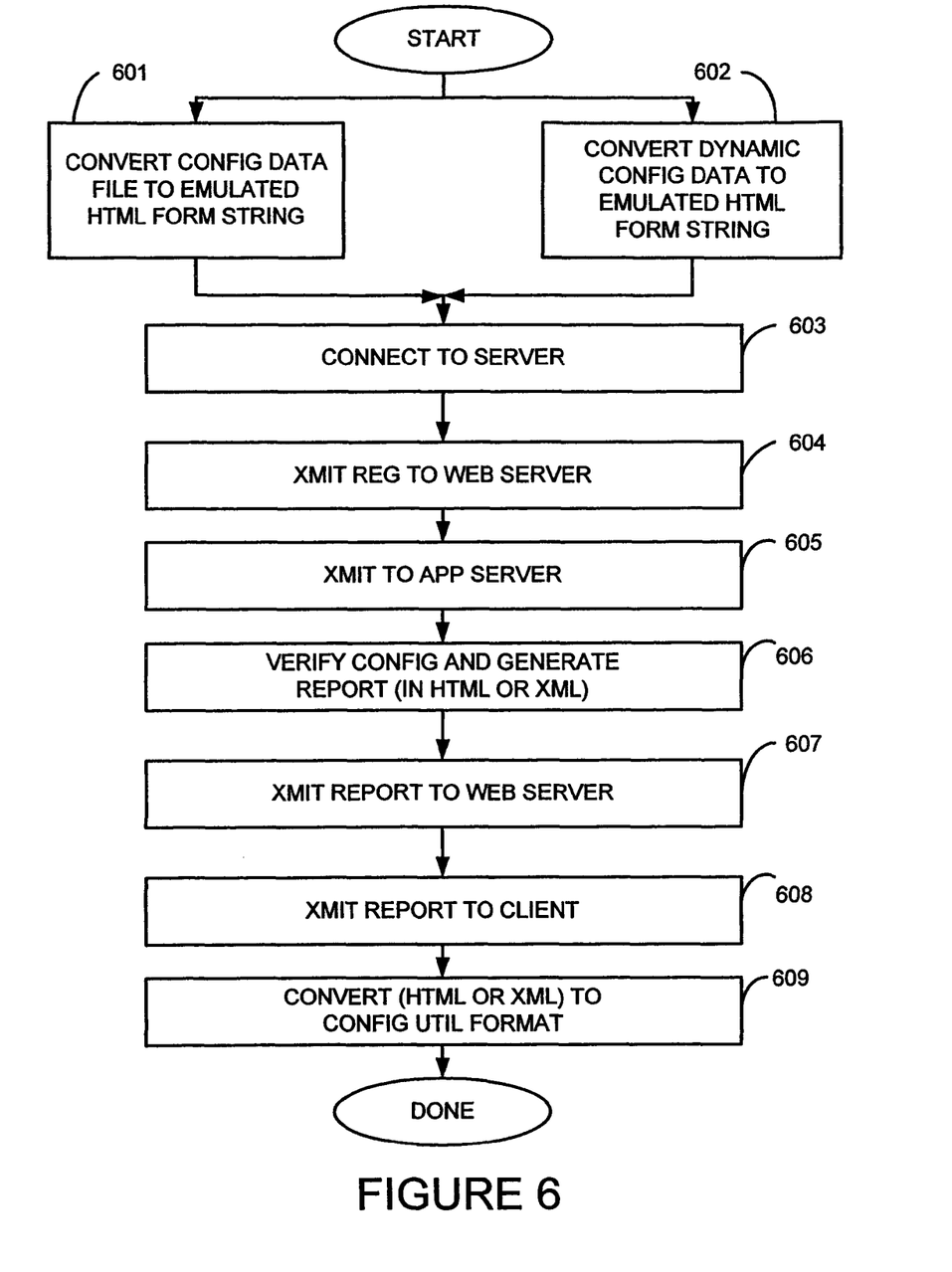
FIG. 6 is a high-level flow diagram showing in greater detail the process of verifying a system configuration record by submitting a request to a web server, according to the preferred embodiment.

FIG. 5 is a high-level flow diagram of the process of managing configuration records, according to the preferred embodiment. The same general process may be used for an original configuration of a new system or for a re-configuration, and may be used for multiple batched and/or scheduled operations as well as generation and verification of isolated configurations, it being understood that some steps might be modified or omitted, depending on the needs of a particular process.

Referring to FIG. 5, configuration utility 403 executing in client system 203 generates a configuration record for a system using any of various techniques, of which three are represented as branches in FIG. 5. In a first branch, a user (such as a customer or salesperson) at terminal 315 specifies all the devices, features, placement, connections, and other parameters of an original computer system to be configured, using an interactive editing interface of configuration utility 403 (block 501). In a second branch, a previously existing configuration record is retrieved from storage (block 502), and the interactive editing interface is used to alter the existing configuration by adding, deleting or reconfiguring elements (block 503). The previously existing record may be a record of an actual computer system, or may be a previously generated record of a proposed or hypothetical system. In a third branch, the user interactively specifies certain external performance parameters of the system, such as expected workload, number of expected users, required response time, number and type of I/O devices, and so forth (block 504). An artificial intelligence configuration function within configuration utility 403 then automatically determines a best fit system configuration, given the user's input parameters (block 505). It will be understood that these are simply three examples of configuration generation, and a configuration might be generated by other means.

A single configuration may be generated as described above, or multiple configurations may be generated before further processing (as indicated by the dashed flow line after blocks 501-505, which returns to a point just before blocks 501-505). The result of generating one or more configurations (blocks 510-505) is one or more configuration records 411-413 corresponding to the configurations. Where multiple configurations are generated, it may be desirable to batch or schedule the verification of these multiple configurations together (optional block 506). Batching the configurations may reduce overhead in transmitting and receiving data, and permits the work to be scheduled at a time when the various systems involved are unlikely to be busy (e.g., early morning or weekend hours).

Verification utility 404 executing on client 203 then automatically causes one or more configurations to be verified by invoking servers 201 and 202 to verify the previously generated configuration records. This process is represented at a high level as block 507 in FIG. 5, and is shown in greater detail in FIG. 6.

Referring to FIG. 6, verification utility 404 first converts data contained in a configuration record and representing a computer system configuration to an emulated HTML multi-part form data string (represented alternatively as blocks 601 and 602). Specifically, the emulated HTML multi-part form data string may be generated from a configuration data file in storage (block 601), as would be typical of batch operation, or may be generated from dynamic configuration records in memory (block 602). An emulated HTML multi-part form data string is a data string which server 201 will accept as equivalent to HTML multi-part form data which is generated in response to downloading an HTML form to a browser. The two are not necessarily identical, since form data may include unused fields, comments, and the like, and in some circumstances it may be possible to vary the order of certain parameters.

Where verification utility is called as part of a single, continuous process of generating and verifying a configuration, the required configuration data is likely resident in a dynamic data structure in memory being used by configuration utility 403. In this case, it is possible to construct the emulated HTML multi-part form string directly from the dynamic structured configuration data record and associated data in memory 302, obtaining each required parameter directly from the record field in which it resides (block 602). Because the required data is not obtained from a file (as would typically be the case of complex multi-part form data), such a process avoids the need to first write the configuration record to a file in storage, and to later read in the data file and parse it for relevant configuration parameters. Avoiding these steps thus can provide a significant improvement in performance In certain environments, it may be impractical to construct the emulated HTML multi-part form string directly from dynamic structured data in memory. E.g., where multiple configurations are first generated and then "batched" for verification, the verification request may be sent some considerable time after the configuration record is first created. In such cases, the configuration records are likely in storage as data files, and will be read into memory and parsed for conversion to emulated HTML multi-part form strings (block 601). While this option may involve additional steps at the client system, it has the advantage of allowing verification requests to be submitted at a scheduled time, typically when servers 201 and 202 are less busy.

Conversion is accomplished programmatically by verification utility 404, i.e., computer programming code within verification utility automatically reads data in a configuration record and determines how to place data in the emulated HTML multi-part form data string, without interactive input specification from the user, and without downloading an HTML form. The conversion code might use any conventional programming technique, e.g., it might be entirely in-line code, use any number of called procedures or methods, and/or might refer to internal tables or templates for formatting the configuration data as an emulated HTML multi-part form data string.

The verification utility then invokes internet access function 402 of the operating system to establish a connection with server 201 over the Internet (block 603). The emulated HTML multi-part form data string is then transmitted over the Internet to server 201 as a request for verification of the configuration contained therein (block 604).

Upon receipt of the request, web server 201 forwards the request to application server 202 for verification (block 605), thus acting as a mere conduit. It will be observed that, in this process, web server 201 does not download an HTML form to client system 203. In the preferred embodiment, web server 201 does in fact store an HTML form for configuration data which it will download to a client's browser on request, and receive in return HTML multi-part form data which is functionally equivalent to the emulated HTML multi-part form data transmitted in block 604.

Application server 202 then verifies the configuration represented by the converted record received from web server 201, and generates a report of its results (block 606). The report is generated in either an HTML or XML format, as specified by the client in the request. This report is then transmitted back to web server 201 (block 607). Web server 201 then transmits the report to the client (block 608).

Performing all system verifications at a single, central application server 202 greatly simplifies the burden of maintaining verification code. While it may be theoretically possible to download or otherwise provide verification code to verification utility 404 in each individual client, enabling utility 404 to perform verification directly without use of a server, it would be difficult to ensure that all clients having copies of the verification code have the correct version level at all times.

Upon receiving the report from web server 201 (in either HTML or XML), verification utility 404 converts the report to a format appropriate for use by configuration utility 403 as one of configuration reports 417-419 (block 609). This conversion may optionally include the importing of data from a corresponding configuration record 411-413. In particular, it may be performed by appending the results of a verification to a configuration record, so that the final verification report contains complete configuration data as well as the history of verification.

The completed verification report is then stored as a data file in storage 316 for later use (block 508). If the verification of multiple systems is batched, multiple configurations are transmitted to server 201, verified, and returned, as described above. This multiple verification is represented by the dashed flow line which returns after block 508 to a point before block 507. However, it will be understood that where configurations are batched, the order of performing some steps may overlap.

After the verification report is completed and formatted for use by configuration utility 403, it may be used in any of a variety of ways. For example, all or portions of a report may be displayed to a user on a display (block 509); or printed on hardcopy (block 510); or used to generate an order for a computer system (block 511); or use din any of various other ways.

It will be understood that disclosed herein is a preferred embodiment of a technique for automatically verifying a system configuration by programmatically generating a transmitting emulated HTML multi-part form data to a server, and that many variations in addition to those specifically discussed herein are possible in the method steps shown in FIGS. 5-6 and described above. Specifically, it will be recognized that the order of performing certain steps may be changed, that some steps may be optional or may be performed in a different manner from that described herein, that some steps may be combined, and so forth.

In the preferred embodiment, a verification utility for verifying computer system configurations submits configuration data over the Internet to a server using an emulated HTML multi-part form data string. However, it will be understood that the verification of computer system configuration is but one example of a client application which may use emulated HTML multi-part form data strings to send requests to a server, and that in accordance with the present invention, a large variety of applications executing in a client might submit requests to a server using emulated HTML multi-part form data requests, without the need to download and render a corresponding HTML form, or the need to use the form to format the data for uploading to the server.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 3 as memory 302 and data storage devices 316.

Although a specific embodiment of the invention has been disclosed along with certain alternatives, it will be recognized by those skilled in the art that additional variations in form and detail may be made within the scope of the claims which follow.

What is claimed is:

1. A computer program product stored on a non-transitory computer-readable storage medium for use in a web client computer system for obtaining service from a web server, said computer program product comprising:

a plurality of processor executable instructions recorded on a non-transitory computer-readable storage media, wherein said instructions, when executed by at least one processor in said web client, cause said web client to perform the steps of:

obtaining client data in said web client for use in obtaining service from said web server, said web server providing a first HTML form to requesting clients on the web, said first HTML form for formatting a request string in a web browser for a first service, said request string to be submitted from said web browser to said web server, said request string being formatted according to a first HTML multi-part data string format determined by said first HTML form, said web server further providing said first service in response to receiving requests in said first HTML multi-part data string format;

automatically converting said client data to an emulated HTML multi-part form data string, said emulated HTML multi-part form data string being functionally equivalent to data in said first HTML multi-part data string format and corresponding to a first request for said first service, said automatically converting step being performed programmatically by said web client without requesting said first HTML form from said server and without downloading said first HTML form from said server, and without employing a web browser function to format a request string in said first HTML multi-part data string format using said first HTML form;

automatically submitting said first request for said first service to said web server from said web client in said emulated HTML multi-part form data string; and receiving said first service in response to automatically submitting said first request.

2. The computer program product of claim 1, wherein said client data comprises data contained in at least one dynamic structured data record in a memory of said client, and wherein said step of automatically converting said client data to an emulated HTML multi-part form data string comprises obtaining data for conversion to said emulated HTML multi-part form data string from at least one field of said dynamic structured data record without writing said dynamic structured data record to a file in a storage system of said web client.

3. The computer program product of claim 1, wherein said client data comprises computer system configuration data.

4. The computer program product of claim 3, wherein said first service provided by said web server comprises verification of a computer system configuration represented by said computer system configuration data.

5. The computer program product of claim 1, wherein said plurality of instructions further cause said web client to perform the steps of:

automatically converting said client data to a plurality of emulated HTML multi-part form data strings corresponding to a respective plurality of requests for said first service; and automatically submitting said plurality of requests for said first service to said server from said web client in said plurality of emulated HTML multi-part form data strings in batch.

6. The computer program product of claim 5, wherein said plurality of instructions further cause said web client to perform the step of:

scheduling said step of automatically submitting said plurality of requests for said first service to occur automatically at a future time.

* * * * *